Patented Jan. 26, 1954

2,667,464

UNITED STATES PATENT OFFICE 2,667,464

INSULATION FOR ELECTRICAL CONDUCTORS

Milton S. Greenhalgh, Bridgeport, Conn., assignor to General Electric Company, a corporation of New York No Drawing. Application October 30, 1951, Serial No. 253,979

5 Claims. (Cl. 260—28.5)

The present invention comprises an improvement in insulating materials for conductors and in particular an improvement in electric conductors, which are coated with plastic insulating compositions. Conductors, commonly known as building wire, which is also used for wiring various domestic appliances, as machine tool wire, and for general wiring purposes, are commonly encased in a fireproof insulation, somewhat resembling rubber. The insulation of building wire is required by standards approved for the electrical industry to meet prescribed physical properties adapting it for continuous use over a range of temperature extending from the lowest climatic temperatures to elevated temperatures up to 80° C. or thereabouts. The manufacturers of such wire have imposed even more rigorous requirements in their laboratory standards of mechanical and electrical properties for example by imposing temperature ranges extending even outside of the limits set by trade practices.

Compositions containing polymerized vinyl compounds are being widely used for coating and insulating building wire and the like. It has been conventional practice in the art of compounding polymerized vinyl halide insulations to mix with the resin, in addition to fillers and stabilizers, a proportion of plasticizing agent in order to impart a sufficient degree of flexibility to the vinyl halide compound, while at the same time providing other desired physical properties. A great many plasticizing agents for vinyl halide polymers have been proposed and used; including tricresyl phosphate, diethyl hexyl phthalate, octyl decyl phthalate, tetrahydrofurfuryl oleate, Paraplex G-40 and Paraplex G-60.

The foregoing have all produced useful insulating compositions, and for many purposes for which thermoplastic insulation is used, are fully satisfactory. Nevertheless, in the electrical field, even better mechanical and electrical insulating properties have been desired.

It is an object of this invention to provide an improved polymerized vinyl halide wire insulation which will have and retain adequate electrical and mechanical properties through a much wider range of ambient temperature than has heretofore been available.

According to the present invention an improved thermoplastic wire insulation is provided by compounding together with a polymerized vinyl halide resin which is associated with the usual fillers and a suitable stabilizer, plasticizing additions of certain proportions of octyl decyl phthalate in combination with chlorinated paraffin wax, the latter combination functioning conjointly for improving the physical properties of the resulting composition. This composition not only has more than adequate electrical properties for uses such as building wire and the like, and retains such electrical properties through a very wide temperature range, but also has a desired tensile strength, flexibility and toughness at both low and high temperatures. This combination of electrical and mechanical properties has not heretofore been available in polyvinyl chloride insulations.

Specifically, my improved composition may comprise a major proportion of polymerized vinyl halide, as for example, polymerization products of vinyl chloride copolymers of vinyl chloride and vinyl acetate and, in general, conventional vinyl molding and extruding compositions. Such compositions have adequate heat stability at the upper part of the working range of temperatures and also retain flexibility and toughness at the lower subzero range of temperatures to which such compositions are exposed, for example, as insulating coatings for electrical conductors.

The following example is illustrative of the present invention as applied to extrudable insulation upon various types of wire.

| Ingredients | Approximate percentages by weight |
|---|---|
| Polymerized vinyl halide | 55 |
| Filler (e. g. clay and whiting) | 10 |
| Stabilizer | 5 |
| Octyl decyl phthalate | 20 |
| Chlorinated paraffin wax (containing about 40% chlorine) | 10 |

The amount of vinyl halide stated may be varied depending on specific desired properties but in general should be within the limits of about 45 to 65 percent by weight. The filler may consist of any suitable inert material, and may be varied within the limits of about zero up to about 20 percent. It is customary to include also about one percent of a suitable inert coloring agent. In the proportions given above, the coloring agent has been included as part of the filler.

The stabilizer may consist of conventional monohydrous tribasic lead sulfate or basic lead silicate sulfate or of dibasic lead phosphite and may be varied within the limits of about 5 to 7 percent.

The chlorinated paraffin wax may have a chlorine content of about 40 percent, generally within the limits of about 38 to 42 percent chlorine. The amount of chlorinated paraffin wax may be varied within the limits of about 8 to 12 percent. The amount of octyl decyl phthalate which is sold in the open market as Hercoflex 150 may be varied within the limits of about 18 to 22 percent.

The combined amount of phthalate and chlorinated paraffin wax additions should be maintained within the limits of about 25 to 35 percent. The proportions of 20 percent of octyl decyl phthalate and 10 percent of chlorinated paraffin wax have been found to give the best results. A composition of the above example has an insulation resistance characteristic at the given conditions of test (450 volts D. C. at 70° C.) which is about threefold greater than that of a similar composition lacking chlorinated paraffin wax, without material sacrifice of other desirable properties over the stated range of temperatures, that is from about minus 30° C. to about 80° C. to 100° C.

As a consequence of my invention, there has been provided an insulated wire clad with a thermoplastic insulation having sufficient insulation resistance to operate efficiently and safely in the field indicated for carrying currents in the range of about 100 to 600 volts. In general, it may be said that such wire has greater flexibility in the range of subzero climatic temperature, greater thermal stability at higher temperatures and higher insulation resistance than set by such code requirements as Fire Underwriters' "Standard for Thermoplastic Insulated Wires" and "Standard for Rubber-Covered Wires and Cables."

What I claim as new and desire to secure by Letters Patent in the United States is:

1. A heat-resistant insulating composition comprising the combination of about 45 to 65 percent of a vinyl halide resin selected from the class consisting of polyvinyl chloride and copolymers of vinyl chloride and vinyl acetate, about 18 to 22 percent of octyl decyl phthalate, about 8 to 12 percent of chlorinated paraffin wax, up to about 20 percent of inert filler and about 5 to 7 percent of stabilizer.

2. A heat-resistant insulating composition comprising in combination with a mixture of conventional components of a vinyl halide resin selected from the class consisting of polyvinyl chloride and copolymers of vinyl chloride and vinyl acetate, inert finely divided filler, and a stabilizing component, the combination in admixture with aforesaid components of about 20 percent by weight of octyl decyl phthalate and about 10 percent of chlorinated paraffin wax containing about 40 percent of combined chlorine.

3. An electrical conductor and an insulating sheath surrounding and adhering to said conductor comprising, by weight, the combination in admixture of the following ingredients in substantially the following approximate proportions by weight:

| Ingredients | Approximate percentages by weight |
| --- | --- |
| Polymerized vinyl chloride | 55 |
| Octyl decyl phthalate | 20 |
| Paraffin wax containing about 40 percent chlorine | 10 |
| Inert filler | 9 |
| Stabilizer | 6 |

4. An electrical conductor having an insulating sheath surrounding and adhering to said conductor comprising a heat-resistant insulating composition comprising, by weight, 45 to 65% of a vinyl halide resin selected from the class consisting of polyvinyl chloride and copolymers of vinyl chloride and vinyl acetate, about 18 to 22% octyl decyl phthalate, about 8 to 12% chlorinated paraffin wax, up to about 20% of an inert filler, and a stabilizer for the aforesaid vinyl halide resin.

5. A heat resistant insulating composition comprising, by weight, from 45 to 65% of a vinyl halide resin selected from the class consisting of polyvinyl chloride and copolymers of vinyl chloride and vinyl acetate, about 18 to 22% octyl decyl phthalate, about 8 to 12% chlorinated paraffin wax, up to about 20% of an inert filler and a stabilizer for the aforesaid vinyl halide resin.

MILTON S. GREENHALGH.

References Cited in the file of this patent

UNITED STATES PATENTS

| Number | Name | Date |
| --- | --- | --- |
| 2,421,409 | Brookman | June 3, 1947 |

FOREIGN PATENTS

| Number | Country | Date |
| --- | --- | --- |
| 632,758 | Great Britain | Dec. 5, 1949 |